D. C. ALDRICH.
Churn.

No. 46,202.

Patented Feb. 7, 1865.

Witnesses:

Inventor:

UNITED STATES PATENT OFFICE.

DAVID C. ALDRICH, OF ANAMOSA, IOWA.

IMPROVEMENT IN CHURNS.

Specification forming part of Letters Patent No. 46,202, dated February 7, 1865.

*To all whom it may concern:*

Be it known that I, DAVID C. ALDRICH, of Anamosa, in the county of Jones and State of Iowa, have invented a new and Improved Churn; and I do hereby declare that the following is a full, clear, and exact description thereof, which will enable those skilled in the art to make and use the same, reference being had to the accompanying drawings, forming part of this specification, in which—

Figure 1:
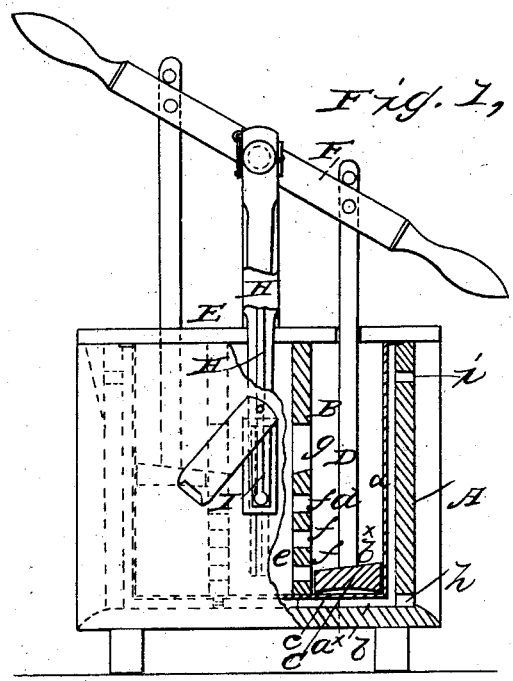
Figure 2:
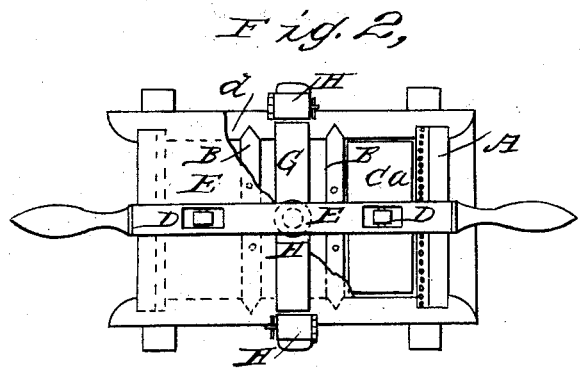

Figure 1 represents a side view of my invention, partly in section; Fig. 2, a plan or top view of the same.

Similar letters of reference indicate corresponding parts.

This invention relates to a new and improved churn of that class commonly termed "atmospheric;" and it consists in the employment or use of two dashers, perforated partition-plates, an air-tube, and a water-chamber, all arranged in such a manner as to cause butter to be rapidly produced in good condition, and to separate the butter from the butter-milk, as hereinafter fully set forth.

A represents a box of rectangular form and having an inner lining of zinc, $a$, which forms a chamber, $b$, all around the cream-receptacle, the bottom of the chamber $b$ having two parallel bridges, $c$ $c$, in it to serve as supports. The cream-receptacle is divided into three compartments, $d$ $d$ $e$, by two vertical partition-plates, B B, which extend the whole height of the cream-receptacle, the lower edges of the latter resting on the zinc $a$ just over the bridges $c$ $c$, as shown in Fig. 1. The partition-plates B B, at their lower parts, are perforated with holes $f$, and each plate has an oblong mortise, $g$, made in it above the perforations $f$, as also shown in Fig. 1.

In each compartment $d$ there is placed a dasher, C. These dashers work snugly in the compartments $d$, and they are made concave at their under sides, as shown at $a^\times$, and inclined at their upper surfaces, down toward the partition-plates B B, as shown at $b^\times$. The dashers are attached to the lower ends of rods D D, which pass up through the lid E of the churn, and are connected to a lever, F, which is attached centrally to a rock-shaft, G, the bearings of which are in the upper ends of uprights H H, the latter being at the sides of the box A.

By operating the lever F it will be seen that the dashers C C will be made to rise and fall in the compartments $d$ $d$.

The compartment $e$, between the compartments $d$ $d$, I term an "air-chamber," and it has a vertical tube, H, fitted in it, said tube forming a communication between the external air and the lower part of the compartment $e$, the lower end of the tube H projecting down within an inch or two of the zinc $a$, and the upper part passing through the lid E.

I is a thermometer, which is fitted in the side of the box A, and has the back of its graduated plate in contact with the cream in the compartment $e$ to indicate the temperature thereof.

The cream is brought to the proper temperature by the introduction of cold or warm water in the chamber $b$.

During the process of churning, the cream is forced from the compartments $d$ $d$ into the compartment $e$, and vice versa, the under concave sides of the dashers C C causing air to be forced down into the cream each time a dasher descends, the tube H also admitting air into the cream in $e$ and causing air to be forced through or incorporated with the whole mass of cream during the churning operation. The under concave sides $a^\times$ of the dashers receive air each time they rise above the surface of the cream.

The upper inclined surfaces, $b^\times$, of the dashers serve as gatherers, when the butter is formed, and each time they rise they deposit the butter in the compartment $e$, the butter passing through the mortises $g$.

The box A has a hole, $h$, made in it at one side to draw the water from the chamber $b$, and has a hole, $i$, made in it near its upper end, in order to supply said compartment with water, said holes being provided with plugs. The chamber $b$ has also a vent hole at its upper end.

This invention has been practically tested, and it operates well, producing butter expeditiously and in good condition.

I do not claim the employment or use of a thermometer with a churn, for that is an old and well-known device; but I do claim as new and desire to secure by Letters Patent—

1. The partition-plates B B, perforated at their lower ends and provided with an oblong opening, $g$, in connection with the air-tube H in the central compartment, e, and the dashers C C in the compartments d d, all arranged to operate substantially as and for the purpose herein set forth.

2. The concave under surfaces, $a^\times$, of the dashers, in connection with the upper inclined surfaces, $b^\times$, the perforated partition-plates B B, and the air-tube H, for the purpose specified.

3. The water-chamber b, in combination with the perforated partition-plates B B, dashers C C, air-tube H, and thermometer I, as and for the purpose set forth.

DAVID C. ALDRICH.

Witnesses:
   ROBERT DOTT,
   J. D. McCARN.